Patented Sept. 25, 1934

1,974,915

UNITED STATES PATENT OFFICE 1,974,915

GELATINIZED STARCH

Fred O. Giesecke, Evanston, Ill., assignor to International Patents Development Company, Wilmington, Del., a corporation of Delaware No Drawing. Original application December 26, 1928, Serial No. 328,577. Divided and this application July 20, 1931, Serial No. 552,079

5 Claims. (Cl. 127—32)

This invention relates to a corn starch product for use as an adhesive paste, a binder, a filler, a size, or for other analogous purposes, which product may be characterized in that it consists principally of starch so treated as to have when mixed with cold water a colloidal character and capacity for absorbing and holding several times its weight of water when mixed with water without heating. It may contain small quantities of other substances, particularly dextrine, which is produced by the modification of the starch during the manufacture of the product. The product is capable of absorbing and holding water in larger amounts than other adhesives of this general type. This capacity can be varied considerably. The amount of dextrine which the product contains can also be varied within certain limits. When a paste is formed of this product it will stand for a long time without liquefying and without fermenting.

This application is a division of my copending application, Serial No. 328,577, filed December 26, 1928.

The material used for making the product may be a commercially pure, dry starch to which water is added in suitable amounts; or as is preferable particularly for reasons of convenience and economy, starch taken from the starch tables employed in the manufacture of starch from corn by the wet method may be used as the raw material, in which case this table starch may or may not be subjected to washing in washing filters to remove soluble substances. Ordinarily it will be sufficient to use unwashed table starch as flushed from the tables. This magma ordinarily has a density of about 16° Baumé. In such case the magma is partially dewatered, for example in a filter of the type commonly used in the starch industry for dewatering starch to reduce the material to a more or less solid but moist state. Preferably the moisture content is reduced by the dewatering operation to about 46% by weight of the material. The starch is then subjected to heat to further reduce the moisture content from 38% to 42%. Some latitude is permitted in respect to the amount of water left in the starch which may vary from 25% to 50% although with the moisture content below 38% the adhesive properties of the product will be considerably lessened. The preferred amount of water, however, is in the neighborhood of 40%.

The starch, as stated, will contain certain substances which will vary in kind and quantity in accordance with the methods used in the extraction of the starch from the corn, and also according to whether the starch, if taken from the tables, is washed as well as dewatered in the starch filter. These non-starch substances in the particular product that is the subject of the present invention, will be relatively small. The following is a specific example of the material which may be used, assuming that one employs unwashed starch from the tables:

Wet basis

| | Percent |
|---|---|
| Solid substances | 58.86 |
| Water | 41.14 |
| Total | 100.00 |

Dry basis

| | Percent |
|---|---|
| Starch | 98.02 |
| Protein | 0.42 |
| All soluble substances | 0.27 |
| Ash | 0.17 |
| Oil | 0.30 |
| Not accounted for | 0.80 |

Acidity 0.077% (titration with phenol phthalein indicator calculated as (HCL). pH=4.9.

Some of the protein may be soluble and this is included in the item of soluble substances.

This material consisting essentially, it will be seen, of starch having a very high degree of purity for commercial starch after having been partially dewatered as above set forth is subjected to heat and pressure between rolls as described in my copending application, Serial No. 328,577, referred to above.

In accordance with this preferred method, the rolls are hollow, are set approximately 0.005 of an inch apart, are 30 inches in diameter and revolved at about two revolutions per minute. The rolls are kept hot by having steam maintained therein at approximately 90 pounds per square inch to give a steam temperature of about 331° F., giving a superficial temperature of about 300° F. This treatment brings about the disruption of the starch cells, that is to say the gelatinization of the starch and some of the starch is converted into dextrine. The material is compressed to form thin friable flaky sheets which may be ground to any desired degree of fineness in a suitable pulverizing mill.

The following table gives the result of analysis of a product made as above described:

| | |
|---|---|
| Solid substances | 92.66% |
| Moisture | 7.34% |

*Dry basis*

| | |
|---|---|
| Starch | 92.20% |
| Protein | 0.46% |
| Soluble substances | 7.66% |
| Dextrine | 7.31% |
| Ash | 0.17% |
| Dextrose | Trace |
| Oil | 0.30% |
| Acidity | 0.70% |
| pH | 5.2 |

Water absorption—10 (one part of product capable of absorbing ten parts of its weight of water).

This analysis is typical of a product made by a run of starch of the composition above indicated. Due allowance must be made, however, for inconsequential errors in laboratory analyses and for slight discrepancies due to the impracticability of taking exactly correspondent samples of raw material and finished product.

It will be understood that the items in the last dry basis table are not mutually exclusive. The dextrine is largely a soluble substance and the protein to some extent soluble.

The extent to which the starch is modified may be varied by varying the initial water content, the temperature of the rolls, the pressure exerted by the rolls, and the length of time of the heat and pressure treatment. Without material change in the product the time factor, for example, may be decreased by increasing the temperature. The proportion of dextrinization to gelatinization may be increased by lowering moisture content, or by increasing temperature. The protein content may, if desired, be increased by having more gluten in the raw starch, but preferably the protein content is kept as low as possible for the product herein described. I do not claim herein, however, a product containing a substantial amount of gluten as that product is the subject of a copending application Serial No. 552,078, filed July 20, 1931. For the product of this invention it is desirable that the gluten content should not be in excess of 0.5%.

Variation of the composition of the product can be made in accordance with the particular characteristics desired in view of the intended use of the product. For a wall paper paste the water absorption should not be the maximum obtainable. It may be about 8. This diminished capacity for water absorption may be brought about by increasing the temperature of treatment to give a dextrine content of approximately 9%. Because of the small protein content the product makes a very desirable wall paper paste.

For a filler or binder, for briquetting for example, the water absorption capacity should be high, and, in fact, may be made as high as 1 to 12 by limiting the dextrine content to from 6% to 8%.

The product above described may be varied in composition within the following limits (dry substance basis):

| | |
|---|---|
| Starch | 87% to 92% |
| Protein | 0.1% to 0.5% |
| Dextrine | 6% to 12% |
| Total solubles | 7.5% to 12.5% |
| Water absorption | 1–8 to 1–12 |

The moisture content of this product is not an important factor except as trade custom and requirements may standardize this item. A desirable moisture content is about 10%.

The product can be manufactured more cheaply than the starch pastes made from hominy or corn grits by the dry milling method. The product has a higher capacity for water absorption than the products made from corn grits, due, perhaps, to the fact that the starch granules are treated separately instead of in aggregates.

It is intended to cover by patent all modifications of the described product within the scope of the appended claims. However, no claim is made to the hereinabove described process as such process is described in application, Serial No. 328,577 above referred to.

I claim:

1. Gelatinized corn starch product containing substances in approximately the following proportions by weight: starch 91.20%; protein not substantially in excess of 0.46%; soluble substances 7.66%; and dextrine 7.31%; the product forming an adhesive paste when mixed with water and having a water absorption capacity of approximately 10.

2. Gelatinized corn starch product containing substances in approximately the following proportions by weight: starch 87% to 92%; protein 0.1% to 0.5%; dextrine 7% to 12%; the product forming an adhesive paste when mixed with water and having a water absorption capacity of from 8 to 12.

3. Gelatinized corn starch product containing substances in approximately the following proportions by weight: starch 87% to 92%; protein 0.1% to 0.5%; dextrine 7% to 12%; total solubles 7.5% to 12.5%; the product forming an adhesive paste when mixed with water and having water absorption capacity of from 8 to 12.

4. A dry comminuted gelatinized corn starch material the individual starch cells of which are compressed and disintegrated, which contains less than 1% of protein and which is modified to have a dextrine content of between 6% and 12.5%.

5. A gelatinized corn starch product, having a water absorption capacity of between 8 and 12, which contains less than 1.0% protein and is modified to have a dextrine content of between 6% and 12.5%.

FRED O. GIESECKE.